United States Patent [19]

Pilby

[11] Patent Number: 5,556,186

[45] Date of Patent: Sep. 17, 1996

[54] LIGHT CONTROL GRID FOR PHOTOGRAPHER'S LIGHT SOURCE

[76] Inventor: Stephen E. Pilby, 9529 - 73 Avenue, Edmonton, Alberta, Canada, T6E 1B1

[21] Appl. No.: 306,593

[22] Filed: Sep. 15, 1994

[51] Int. Cl.⁶ .................................................. G03B 15/02
[52] U.S. Cl. ........................... 362/16; 362/278; 362/290; 362/320; 362/342
[58] Field of Search .............................. 362/16–18, 278, 362/279, 290, 291, 320, 325, 342

[56] References Cited

U.S. PATENT DOCUMENTS

| | | | |
|---|---|---|---|
| 3,135,472 | 6/1964 | Helmholz | 362/291 |
| 3,628,007 | 12/1971 | Rosenberg | 362/342 |
| 4,485,599 | 12/1984 | Perradin | 362/290 |
| 4,959,762 | 9/1990 | Soileau | 362/290 |

FOREIGN PATENT DOCUMENTS

| | | | |
|---|---|---|---|
| 0584491 | 11/1924 | France | 362/290 |
| 0635294 | 9/1936 | Germany | 362/290 |
| 0012630 | 2/1981 | Japan | 362/16 |

*Primary Examiner*—Denise L. Gromada
*Assistant Examiner*—Alan B. Cariaso
*Attorney, Agent, or Firm*—Anthony R. Lambert

[57] ABSTRACT

A grid for a photographer's soft box or like device is made from flexible fabric. The grid is formed by intersecting and interlocking strips of fabric, formed in two sets, strips of one set intersecting the strips of the other set. The strips of intersecting sets are slotted in a complimentary manner. A wire may be used to keep the grid taut if necessary. In some instances, strips of one set may be omitted, such that the grid is formed only of strips extending in one direction. Reflecting material may be placed on inside edges of peripheral strips to guide the light.

4 Claims, 5 Drawing Sheets

LIGHT CONTROL GRID FOR PHOTOGRAPHER'S LIGHT SOURCE

FIELD OF THE INVENTION

This invention relates to light control grids for a photographer's soft box or other large light sources used for photography.

BACKGROUND AND SUMMARY OF THE INVENTION

Light control grids for photographer's soft boxes typically are formed of rigid grids or honeycombs that guide the light from the soft box. The inventor has found that these rigid devices are expensive and difficult to store and use, and therefore came up with the very clever idea of making the grid from flexible fabric. This was not an obvious solution to the problem that the inventor identified since it was not immediately apparent that the grid would work satisfactorily, and in any event the inventor is unaware of uses of fabric grids despite over 30 years of the use of rigid grids.

In addition, the inventor found a remarkable manner of making the grid, namely by using intersecting and interlocking strips of fabric, formed in two sets, strips of one set intersecting the strips of the other set. The strips of intersecting sets are slotted in a complimentary manner. A wire may be used to keep the grid taut if necessary, as for example in larger soft boxes having dimensions greater than about 2 by 3 feet. In some instances, strips of one set may be omitted, such that the grid is formed only of strips extending in one direction. Reflecting material such as gold or silver may be placed on inside edges of peripheral strips to guide the light and to create a warmer more intense quality of light for the photographer.

The general effect of the grid in use is that desirable large light source characteristics can be maintained while at the same time extraneous spread of side light can be controlled. The flexible fabric allows the grid to be made less expensively and easier to transport than rigid grids.

BRIEF DESCRIPTION OF THE DRAWINGS

There will now be described preferred embodiments of the invention, with reference to the drawings, by way of illustration, in which like numerals denote like elements and in which.

DETAILED DESCRIPTION OF PREFERRED EMBODIMENTS

Figure 1:
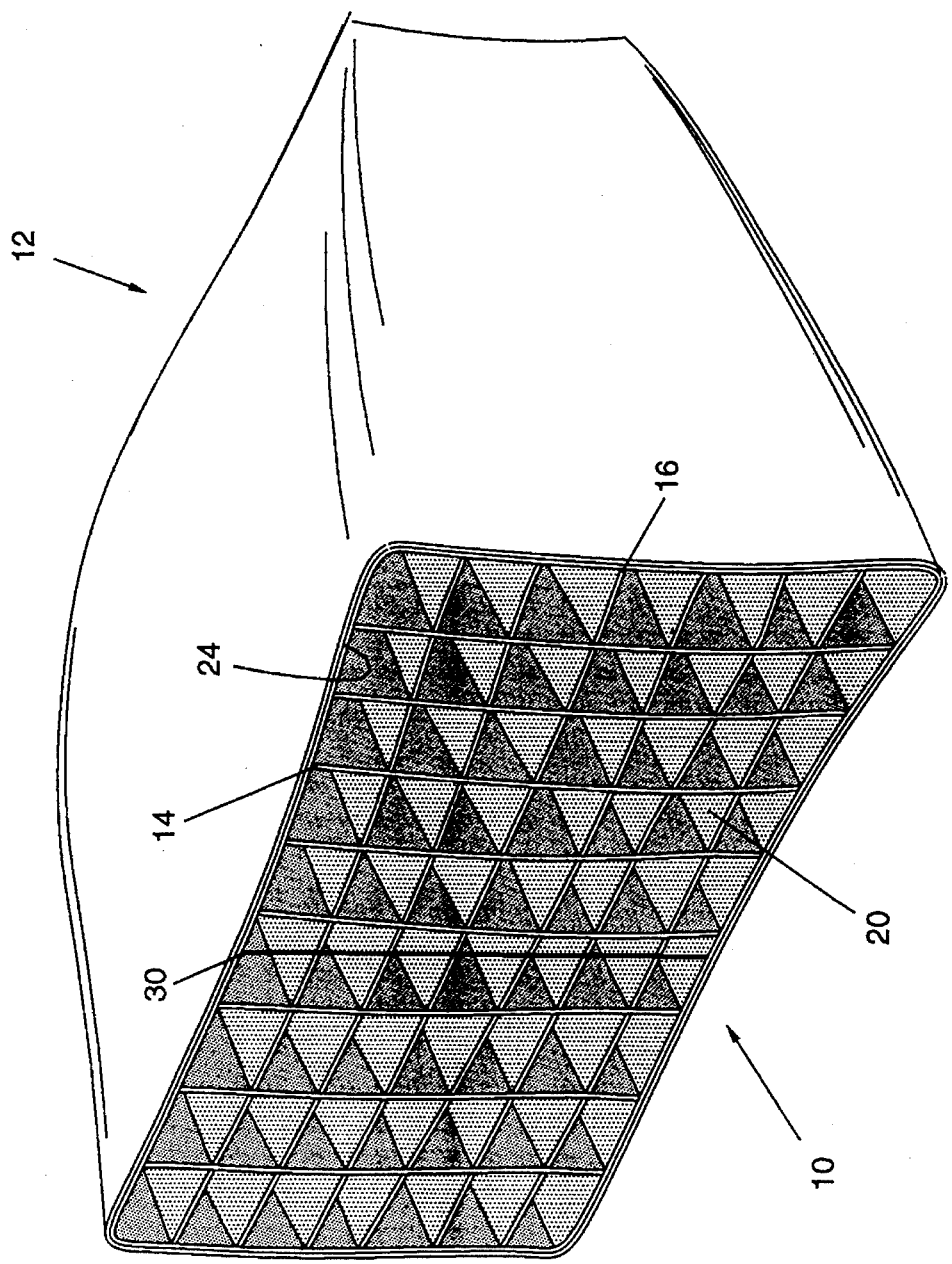
FIG. 1 is a perspective view of a grid according to the invention attached to the front of a photographer's soft box.

Referring to FIG. 1, there is shown a light control grid 10 mounted in the front of a photographer's soft box 12. The soft box 12 may be that of any of several manufacturers. The light control grid 10 may be attached to other light sources such as light diffusion panels, the only requirement being that the light source include a rigid frame having an aperture, defined by the rigid frame, through which light is intended to travel. The light control grid 10 is formed from a grid of flexible fabric strips 14, 16 bounded on the perimeter of the grid by a flexible strip 18. The fabric strips 14, 16 form connected open ended laterally bounded light channels 20. The flexible strip 18 may be a strip of fabric having Velcro™ type hooks on the exterior edge 22 of the strip 18. The Velcro™ type hooks form a means to attach the grid 10 to the photographer's soft box 12 by attachment to strips of Velcro™ type loops on the inside edge 24 of the rigid frame forming the photographer's soft box 12. However, other types of attachment may be used. A wire 30 or like means may extend across the grid in one or both directions to hold the grid taut across the opening of the soft box.

Figure 2:
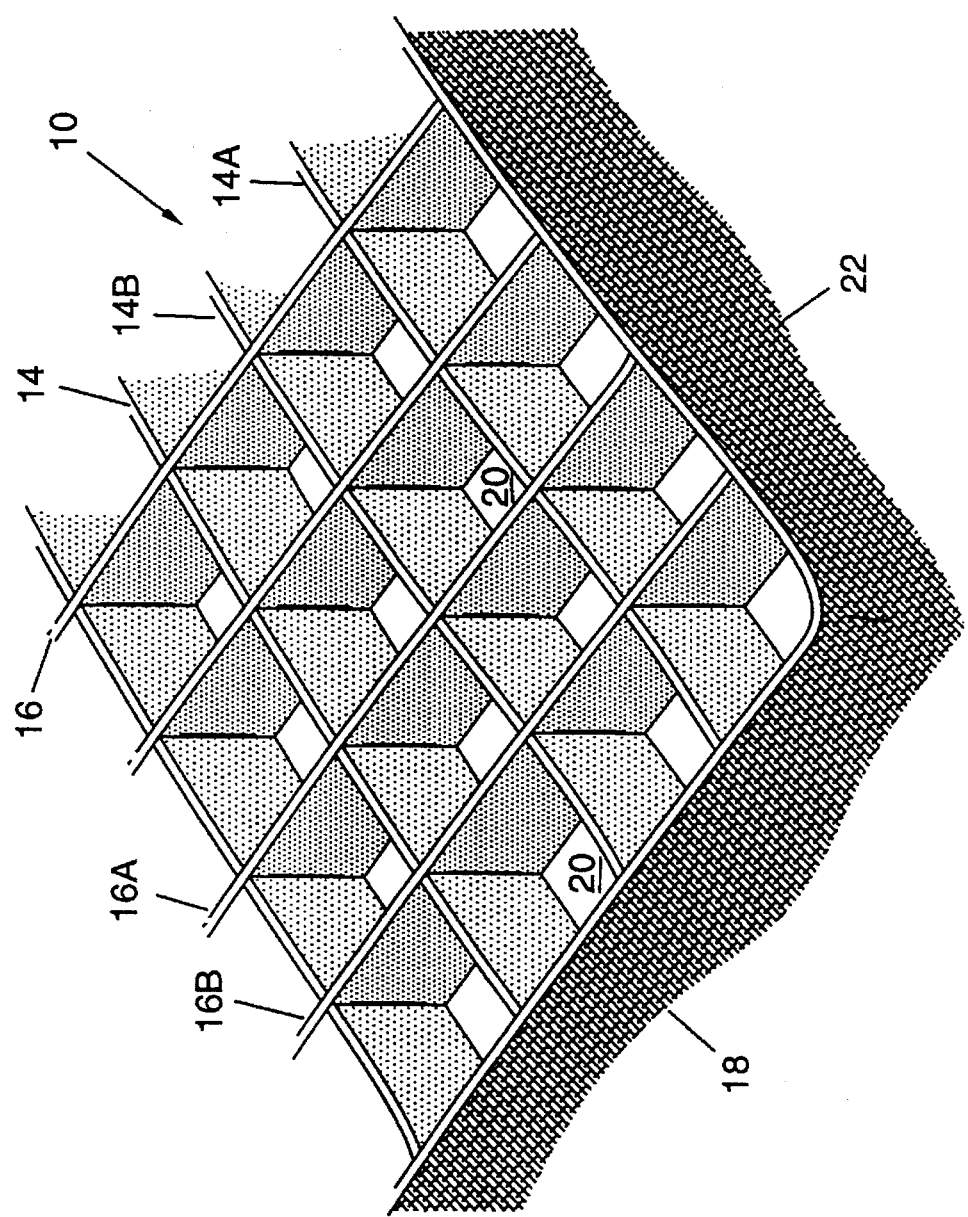
FIG. 2 is a close up perspective of the grid of FIG. 1.
Figure 4:
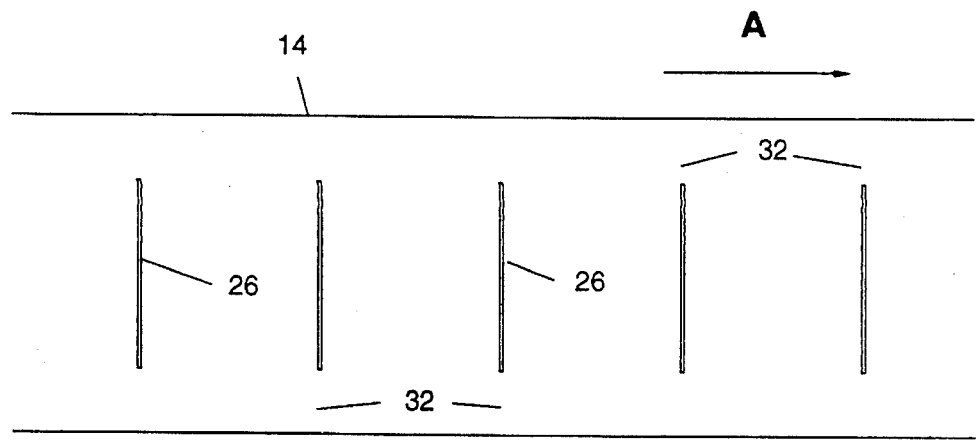
FIG. 4 is a side view of a first type of strip used to make the grid of FIG. 1.
Figure 5:
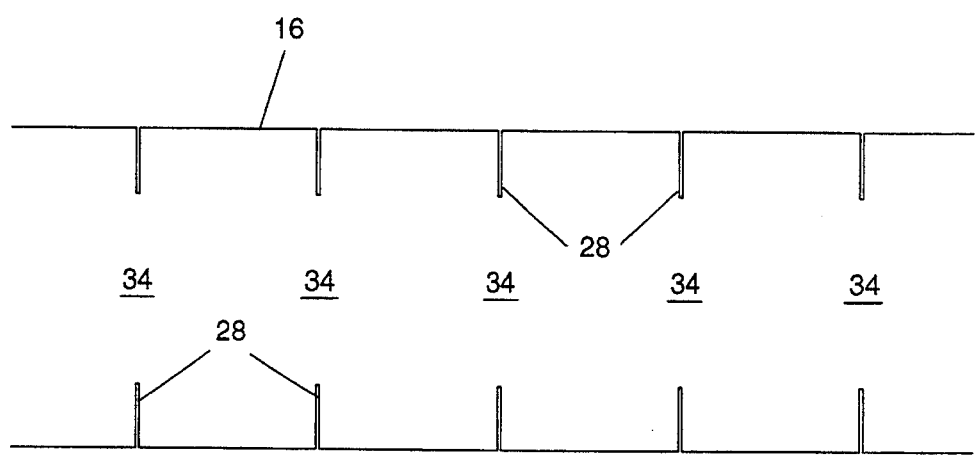
FIG. 5 is a side view of a second type of strip used to make the grid of FIG. 1.

Referring to FIGS. 2, 4 and 5, the control grid is preferably formed from plural intersecting fabric strips 14, 16 which interlock to define the light channels 20 between them. The strips 14, 16 are formed in first and second sets, strips in each set being parallel to others in the set, and each strip in each set intersecting the strips of the other set. The strips 14 of the first set (FIG. 4) include slots 26 extending transversely to the long direction (Arrow A) of the strips 14 and the strips 16 of the second set include complimentary slots or grooves 28 for receiving material (shown at 32) of the strips 14 of the first set adjacent the slots 26. The strips 16 are inserted into the strips 14 such that material at 32 of the strips 14 lies within the slots 28 and material at 34 in the strips 16 lies within the slots 26.

Figure 3:
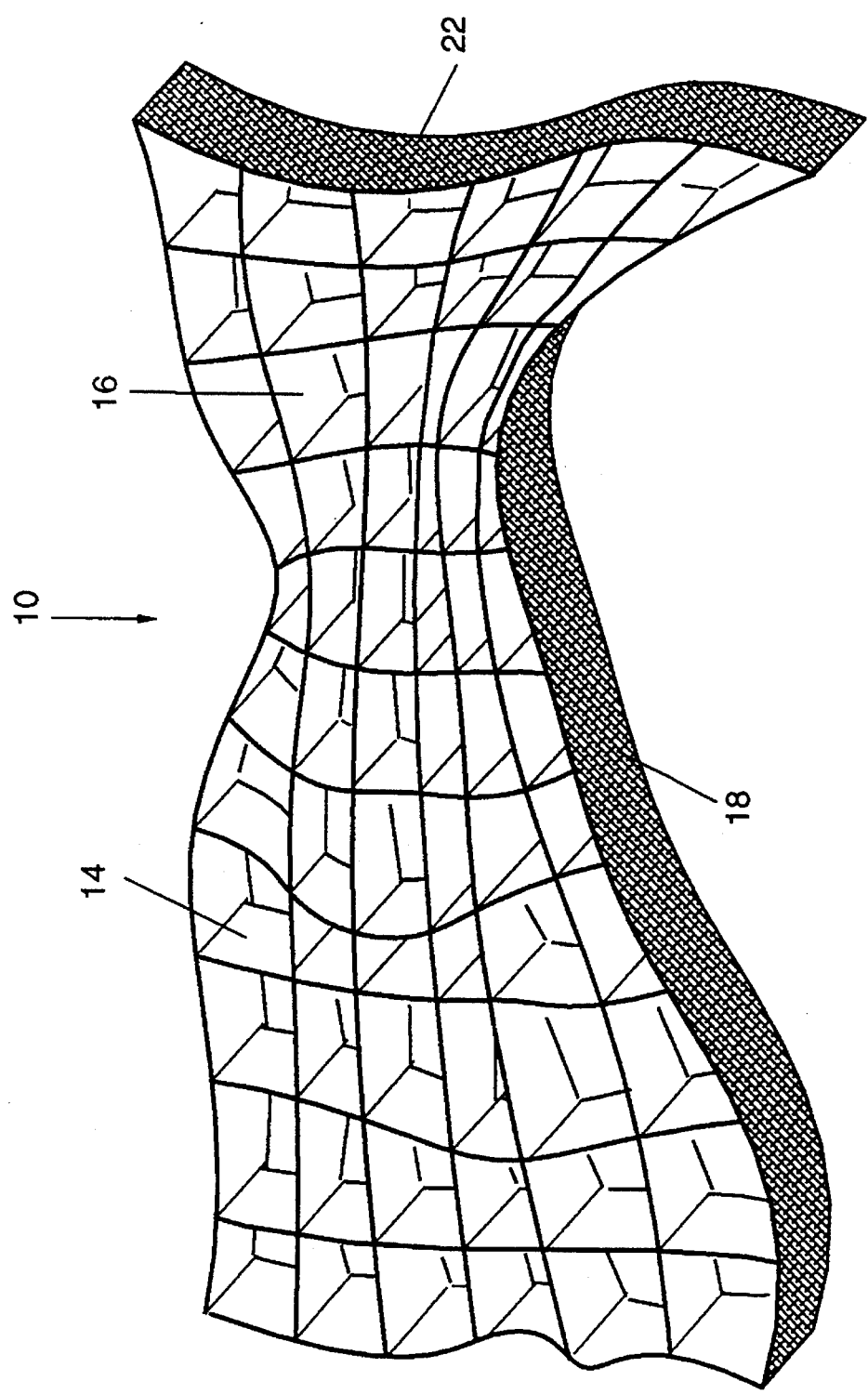
FIG. 3 is a perspective view of a collapsed grid of FIG. 1.

Referring to FIG. 3, the flexible nature of the strips 14, 16 allows the grip to collapse for ease of carrying. Reflecting strips, for example gold, may be placed on inside facing edges 14a, 14b, 16a, 16b of strips 14, 16 near the perimeter of the grid 10, perhaps including the first several rows of strips 14, 16, which strips are referred to here as peripheral strips. Such reflecting strips preferably cover all of one side 14a, 14b, 16a 16b of the strips 14, 16 to thus guide light from the soft box, and may be placed on all inside facing edges of the grid or only near the center, depending on the light requirements of the photographer.

Figure 6:
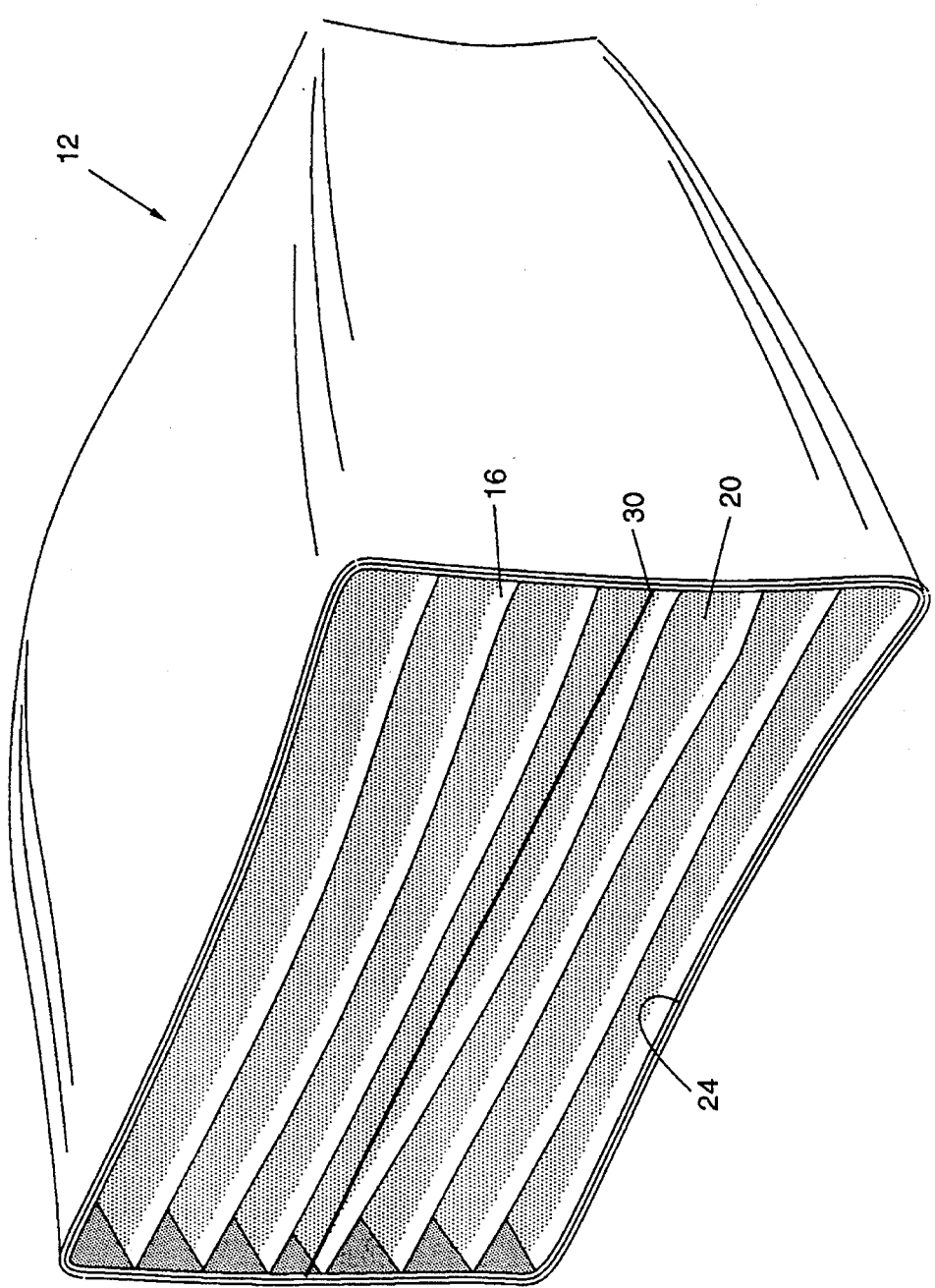
FIG. 6 shows a soft box having a grid formed of lateral strips.

In a further embodiment shown in FIG. 6, strips of one set (eg strips 14) may be omitted. In this case, the wire 30 may be used to ensure that the strips 16 remain parallel.

A person skilled in the art could make immaterial modifications to the invention described and claimed in this patent without departing from the essence of the invention.

The embodiments of the invention in which an exclusive property or privilege is claimed are defined as follows:

1. A light control grid for a photographer's light source, the light source having a rigid frame defining an aperture, the grid comprising:

a grid of flexible fabric strips having a perimeter bounding the grid on four sides and forming plural connected open ended laterally bounded light channels;

the grid being formed from plural intersecting and interlocking fabric strips, the fabric strips being formed in first and second sets, strips in each set being parallel to each other, and each strip in each set intersecting the strips of the other set;

the strips of the first set including pairs of first slots extending transversely to the long direction of the strips, each slot of the pairs of first slots intersecting a different edge of the strips from the other of each pair of first slots and the strips of the second set including complimentary second slots forming openings for receiving material of the strips of the first set between each pair of first slots; and the perimeter being formed of a flexible strip of material having means to attach the grid to the rigid frame across the aperture of the light source on each of the four sides of the perimeter of the grid.

2. A light control grid for a photographer's light source, the light source having a rigid frame defining an aperture, the grid comprising:

a grid of flexible fabric strips having a perimeter bounding the grid on four sides and forming plural connected open ended laterally bounded light channels;

the perimeter being formed of a flexible strip of material having means to attach the grid to the rigid frame across the aperture of the light source on each of the four sides of the perimeter of the grid; and reflecting strips on inside edges of peripheral strips forming the grid.

3. A light control grid for a photographer's light source, the light source having a rigid frame defining an aperture, the grid comprising:

a grid of flexible interlocking fabric strips having a perimeter bounding the grid and forming plural connected open ended laterally bounded light channels;

the perimeter being formed of a flexible strip of material having means to attach the grid to the rigid frame across the aperture of the light source around the perimeter;

the strips being formed in first and second sets, strips in each set being parallel to each other, and each strip in each set intersecting the strips of the other set; and the strips of the first set including pairs of first slots extending transversely to the long direction of the strips, each slot of the pairs of first slots intersecting a different edge of the strips from the other of each pair of first slots and the strips of the second set include complimentary second slots forming openings for receiving material of the strips of the first set between each pair of first slots.

4. The light control grid of claim 3 further including reflecting strips on inside edges of peripheral strips forming the grid.

* * * * *